United States Patent [19]
Rath et al.

[11] 3,917,033
[45] Nov. 4, 1975

[54] SLIDING CALIPER DISC BRAKES

[75] Inventors: Heinrich Bernard Rath, Koblenz-Luetzel; Horst Willi Klassen, Sebastian, both of Germany

[73] Assignee: Girling Limited, Birmingham, England

[22] Filed: May 13, 1974

[21] Appl. No.: 469,600

Related U.S. Application Data
[63] Continuation of Ser. No. 231,913, March 6, 1972, abandoned.

[30] Foreign Application Priority Data
Mar. 9, 1971   United Kingdom............... 6408/71
Mar. 9, 1971   United Kingdom............... 6409/71

[52] U.S. Cl. ............................................. 188/73.3
[51] Int. Cl.² ...................................... F16D 65/02
[58] Field of Search ........ 188/72.4, 72.5, 73.3, 73.4

[56] References Cited
UNITED STATES PATENTS
| | | | |
|---|---|---|---|
| 3,375,906 | 4/1968 | Hayes................................ | 188/73.3 |
| 3,392,809 | 7/1968 | Hodkinson et al............. | 188/73.3 X |
| 3,656,590 | 4/1972 | Newstead....................... | 188/73.3 X |
| 3,677,372 | 7/1972 | Burnett............................. | 188/73.3 |
| 3,682,277 | 8/1972 | Brown............................... | 188/73.3 |

Primary Examiner—George E. A. Halvosa
Attorney, Agent, or Firm—Scrivener, Parker, Scrivener and Clarke

[57] ABSTRACT

In a disc brake such as a sliding caliper disc brake, the caliper is mounted for movement with respect to a torque plate by pin assemblies extending into aligned openings in the caliper and torque plate. The pin assemblies are of multi-part construction, parts of the pin assemblies which provide for movement between the caliper and torque plate being able to remain undisturbed when the caliper is removed from the torque plate.

Another feature is that the openings in the caliper or the torque plate are oversize, so that the pin assemblies are received as a free fit, and the pin assemblies are clamped in the oversize openings by interengagement of screw threaded portions. Sliding surfaces are provided either directly by the shanks of pins or by separate bushes which may be resilient.

The construction is such that the pin assemblies are relieved of clamping forces and drag forces when the brake is actuated.

16 Claims, 17 Drawing Figures

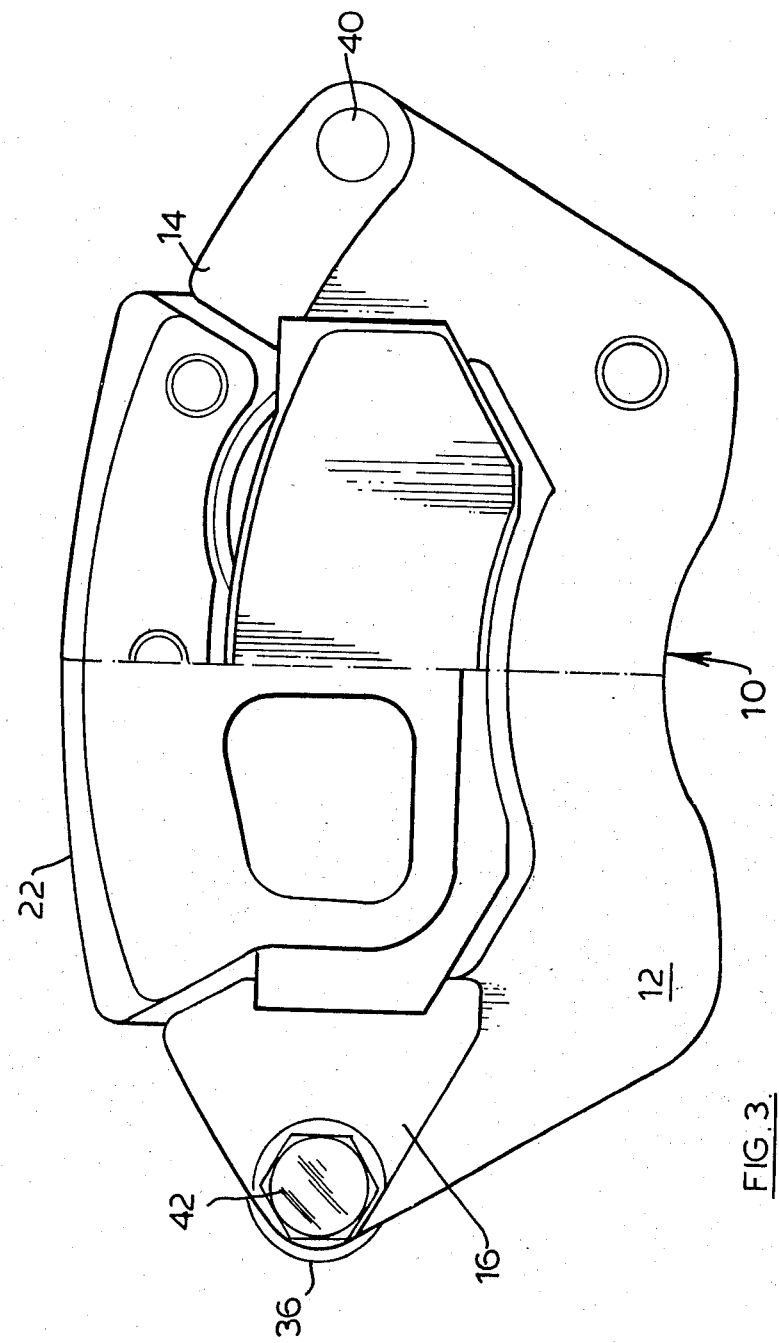

SLIDING CALIPER DISC BRAKES

This application is a continuation of application Ser. No. 231,913 filed March 6, 1972, now abandoned.

The present invention relates to sliding caliper disc brakes.

In disc brakes of the type having a caliper member mounted on a torque plate member by means of a pair of sliding connections, manufacturing inaccuracies may give rise to misalignment between nominally aligned interengageable parts of the brake leading to difficulty in initial assembly and possibly to significantly different resistance to sliding between the brakes fitted to any one vehicle. Attempts to accommodate such misalignment by the use of resilient elements such as rubber bushes have not been wholly satisfactory as a connection which is sufficiently soft to take up significant misalignment is too soft to support the caliper properly on the torque plate.

It is an object of the present invention to provide a sliding caliper disc brake having a caliper mounted on a fixed torque plate by way of a sliding connection which, during assembly, permits transverse movement for proper alignment but which is a rigid connection when the brake is fully assembled.

According to the present invention, there is provided a sliding caliper disc brake comprising a rotatable disc, a torque plate member for fixing to a vehicle frame or the like, a caliper member straddling a minor portion of the periphery of the disc for moving friction pad means disposed on opposite sides of the disc into braking engagement with the disc, portions of the torque plate member being arranged to receive directly drag forces experienced by each of the pad means, motor means in the caliper member for directly urging one pad means onto one side of the disc to cause the caliper member to slide relative to the torque plate member to apply by reaction the opposite pad means to the other side of the disc, and a sliding connection between the caliper member and the torque plate member comprising a first component slidably received in an opening in one of the members, a second component passing through an oversized opening in the other of said members and screw threadedly engaging said first component to releasably clamp the same against the other of said members.

When said two components are in loose screw-threaded engagement, said oversized opening permits the degree of lateral movement of the two components required to align the two components with the opening in said one of the members. Subsequent tightening of the screw-threaded connection clamps said components and said members against further lateral movement.

The invention will be described further, by way of example, with reference to the accompanying drawings, in which:

FIG. 3 is a rear elevation thereof

Figure 12:
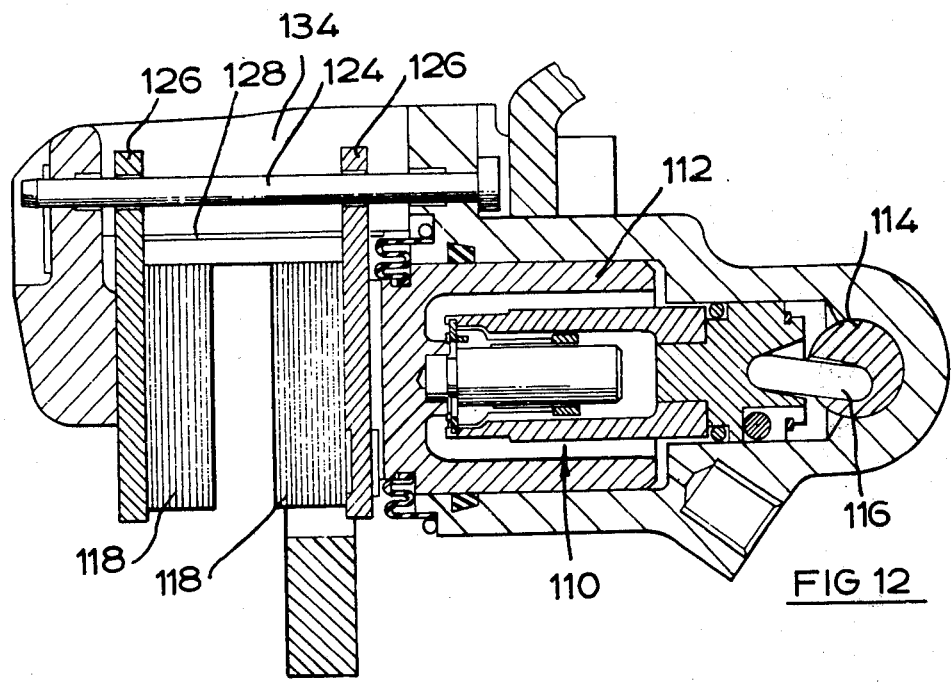
Figure 13:
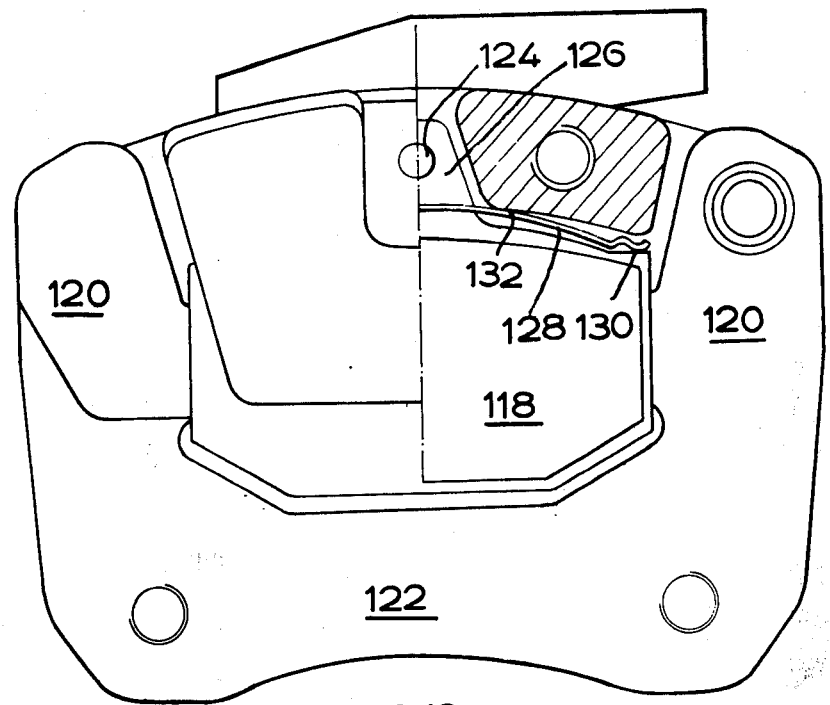
Figure 14:
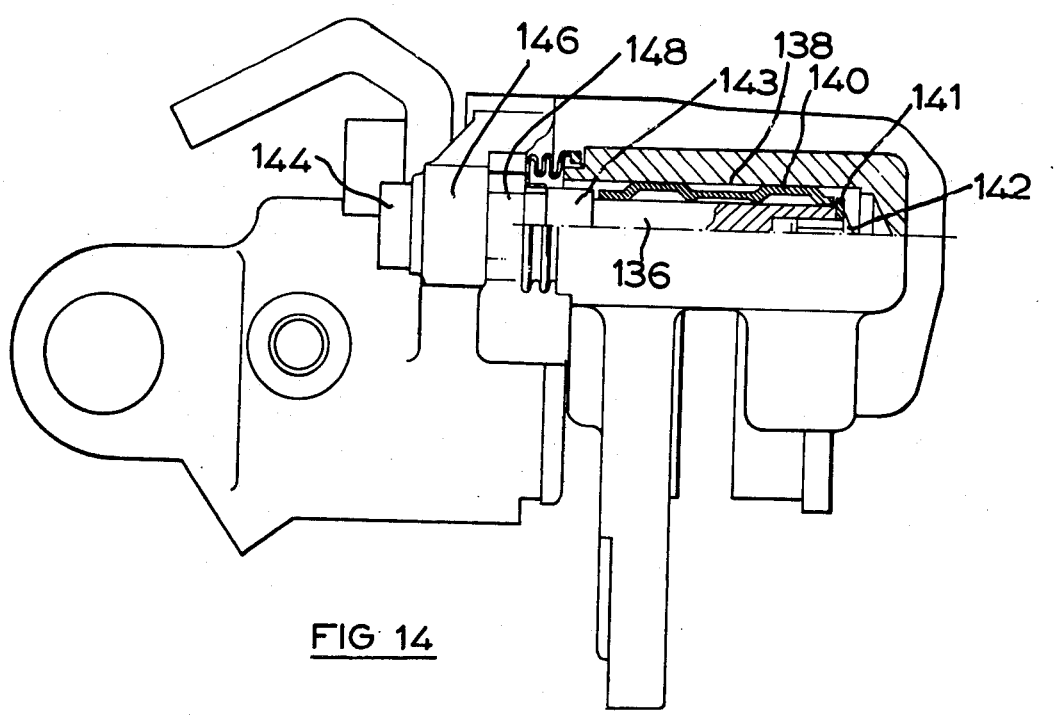
Figure 15:
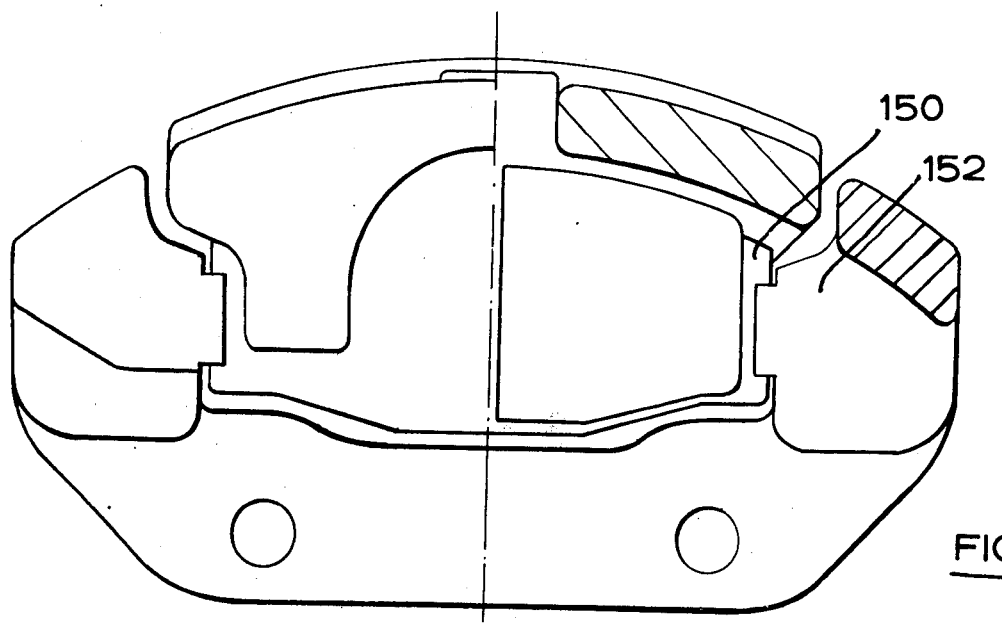
Figure 16:
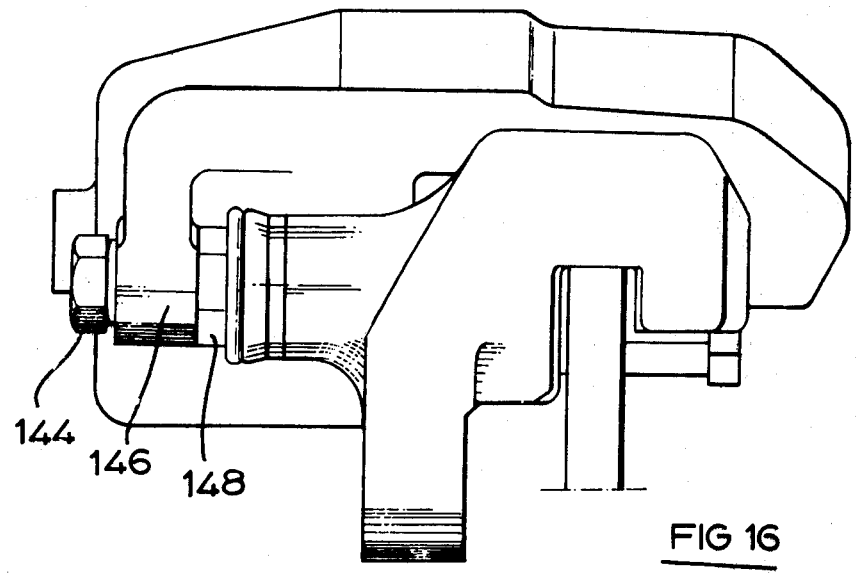

FIGS. 7 to 11 inclusive are fragmentary sectional details of the sliding connection between the caliper member and the torque plate in still further embodiments of the invention;

FIG. 12 is a sectional elevation of a further embodiment;

FIG. 13 is a rear elevation, partly in section, of the embodiment of FIG. 12;

FIG. 14 is an elevation, partly in section, of the embodiment of FIG. 12 from the other side of the brake;

FIG. 15 is a rear elevation, partly in section, of a still further embodiment;

FIG. 16 is a side elevation of the embodiment of FIG. 15; and

Figure 17:
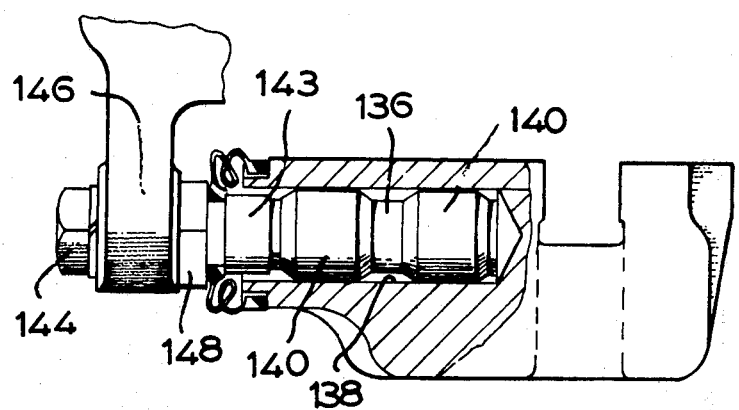

FIG. 17 is a detail, in section, of the embodiment of FIG. 16.

Wherever appropriate, like reference numerals are employed throughout the drawings to denote like parts.

In the sliding caliper disc brake illustrated in FIGS. 1 to 5 inclusive, a torque plate generally designated 10 has a main radially directed portion 12 extending on one side of a brake disc (not shown), the main torque plate portion 12 being bifurcated to present a pair of lateral arms situated at respective circumferential end regions of the torque plate and passing over the brake disc to terminate at the opposite side thereof in radially downwardly directed end 16. A generally U-shaped caliper member 18 has a radially directed rear limb 20 connected by an axial crown portion 22 to a radially directed front limb 24. The crown portion 22 of the caliper passes between the opening defined between the arms 14 of the torque plate and the rear caliper limb 20 connected by an axial crown portion 22 to a radially directed front limb 24. The crown portion 22 of the caliper passes between the opening defined between the arms 14 of the torque plate and the rear caliper limb 20 carries a friction pad assembly 26 capable of engaging one braking face of the brake disc whilst the front caliper limb 24 carries a second friction pad assembly 28 arranged to be engageable with the opposed braking face of the brake disc. The caliper limb 20 is also integrally formed with a pair of circumferentially spaced hydraulic cylinders 30, each carrying a piston 32 displaceable responsive to fluid pressure within its cylinder in order directly to displace the friction pad assembly 26 into engagement with the brake disc. An independent hydraulic circuit may be provided for each hydraulic cylinder 30 and the cylinder bore sizes may be unequal. By virtue of the reaction resulting from engagement of the friction pad assembly with the brake disc, the caliper member is caused to slide relatively to the torque plate 10, thereby to engage the friction pad assembly 28 with the opposite face of the brake disc.

For the purpose of establishing the required sliding connection between the torque plate and the caliper member, the latter is provided with circumferential extensions 34, each of which terminates in an axially directed lug 36. The lugs 36 are axially apertured as indicated at 38 and the apertures 38 are intended each to register axially with a corresponding axial aperture 40 formed in an adjacent torque plate arm 14. Each torque plate aperture 40 receives the shank portion 44 of a pin 42 which is passed through it and which extends beyond it on the side opposite to the head 46 of the pin. The portion 48 of the pin which extends beyond the aperture 40 is threaded and engages an internally threaded region of a bush 50 over which the caliper lug 36 is engaged in sliding relation. Protective rubber or plastics boots 51 are engaged over the bush 50 and each end of the lug 36 in which it is received in order to exclude dirt and moisture and to retain the bush in the lug 36.

Figure 1:
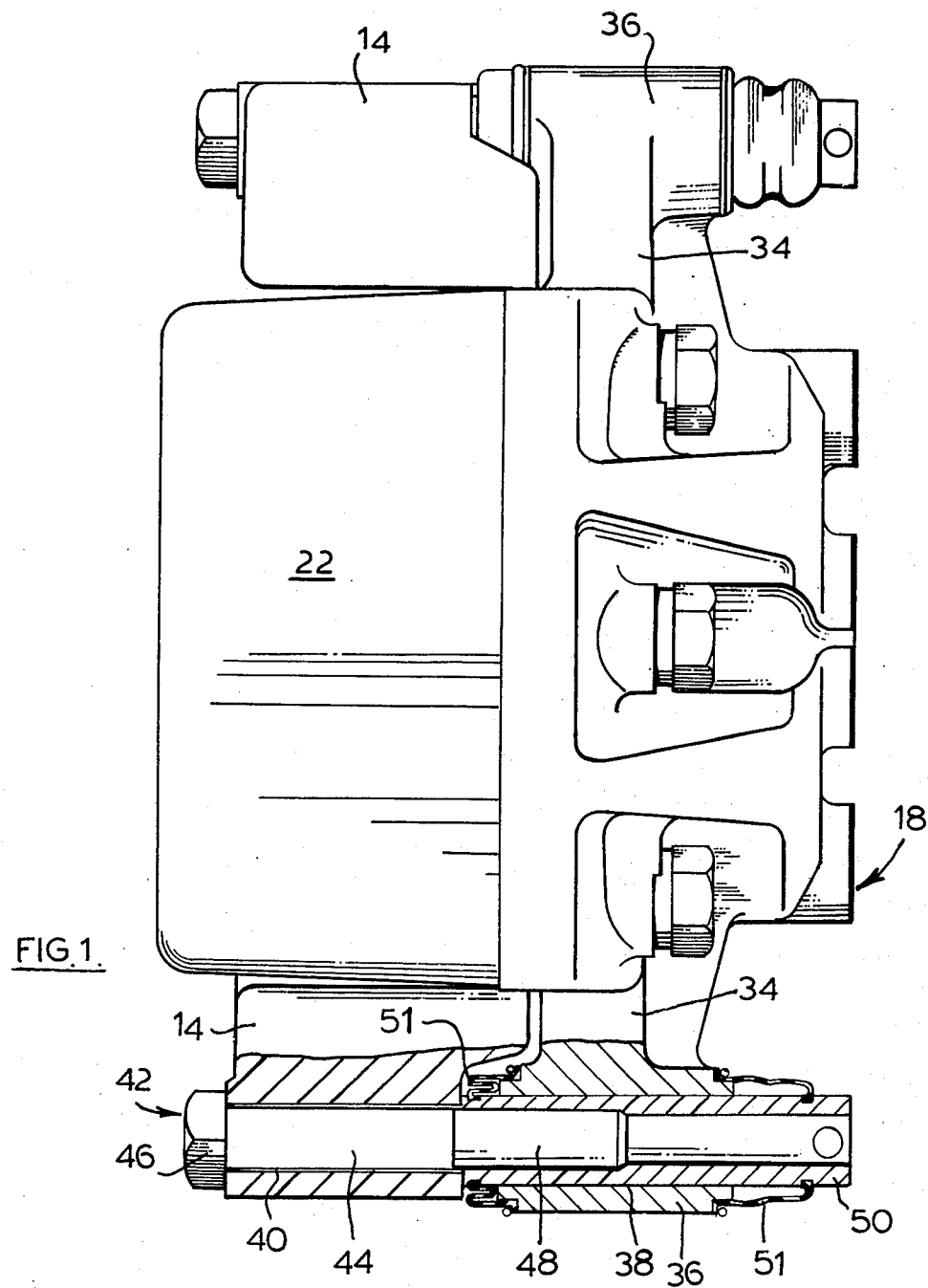
FIG. 1 is a plan view, partly in section, of a sliding caliper disc brake embodying the invention.
Figure 2:
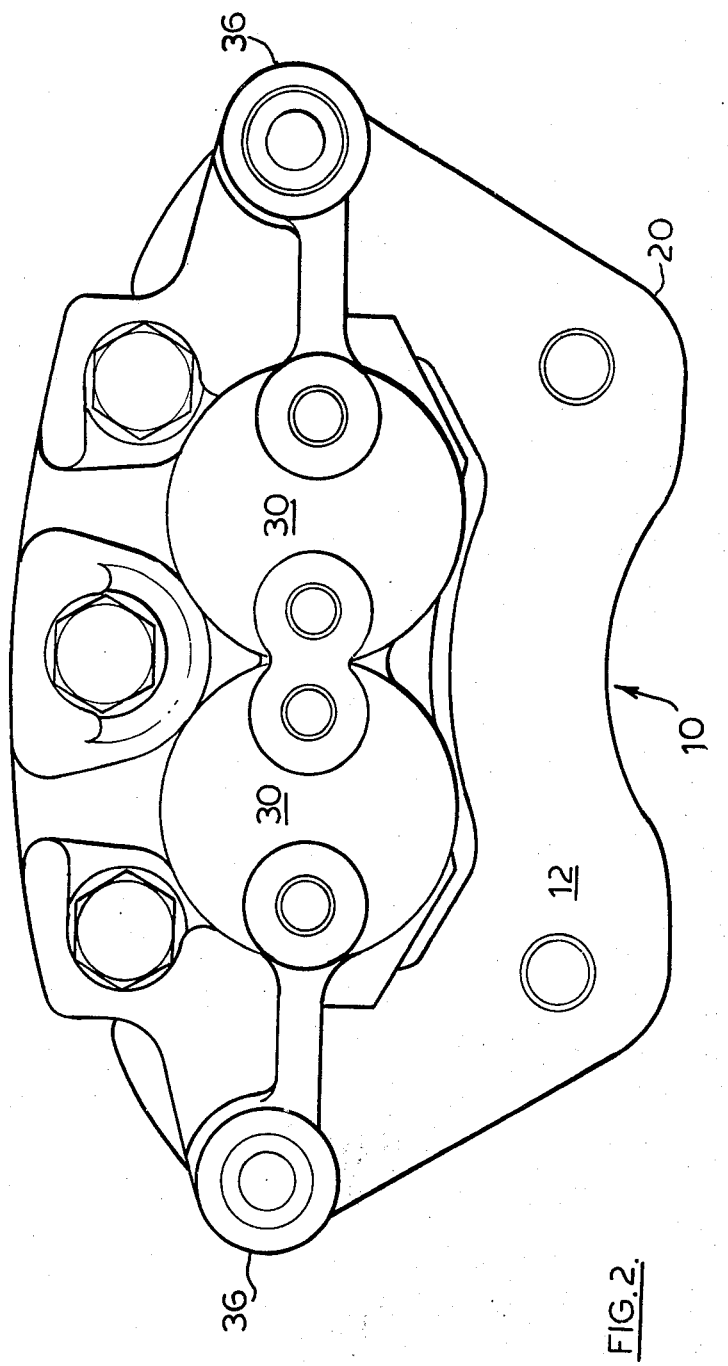
FIG. 2 is a front elevation of the brake.
Figure 5:
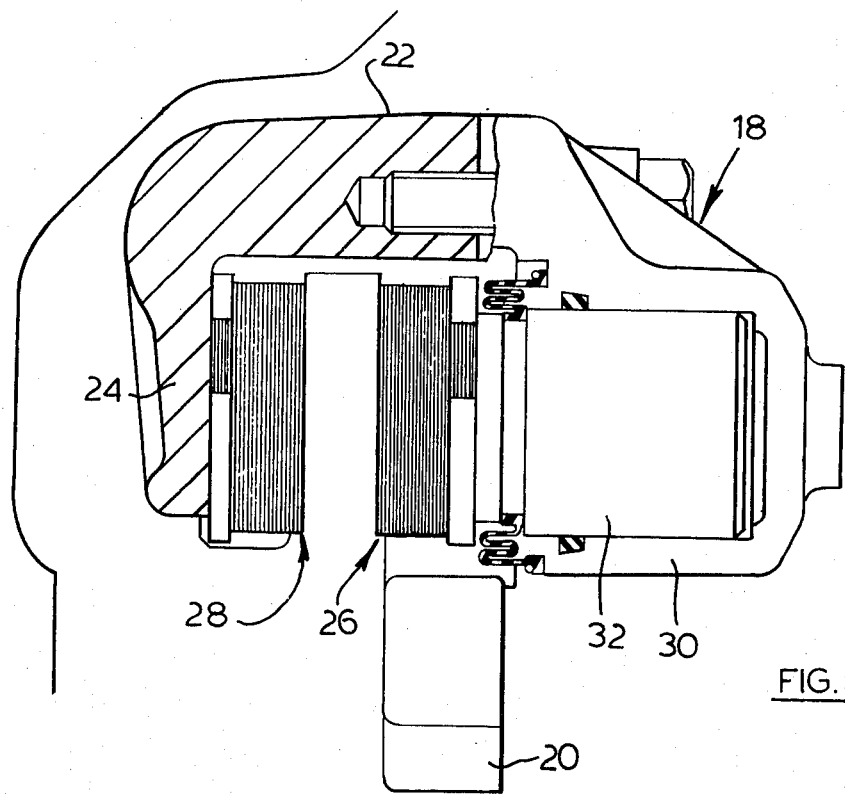
FIG. 5 is an elevation, partly in axial section of the other side of the brake.
Figure 4:
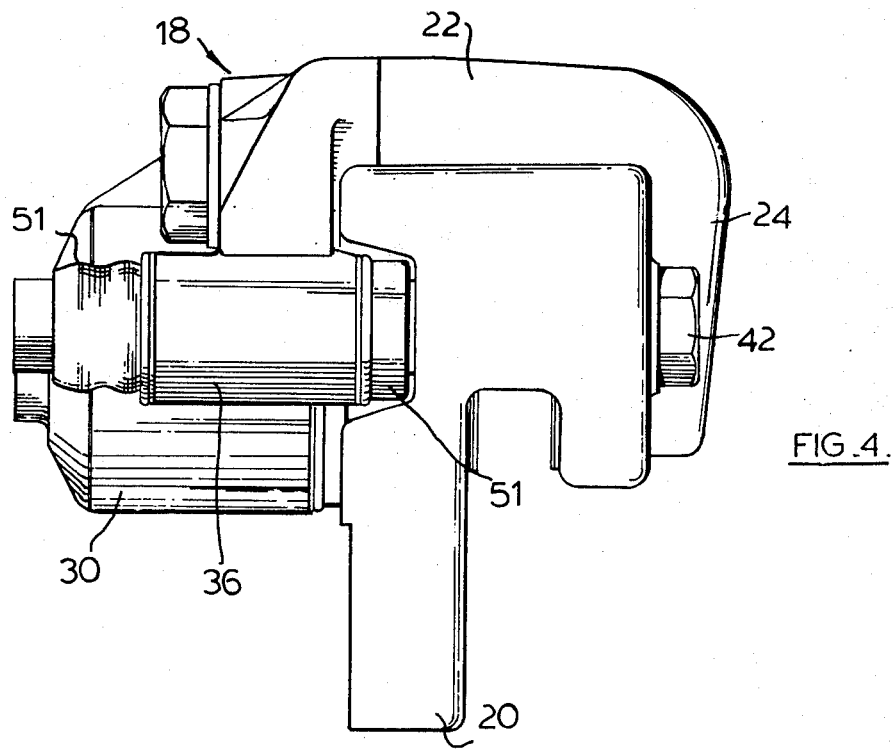
FIG. 4 is an elevation taken from one side of the brake.

By virtue of the pin and bush arrangement shown in the drawings, the caliper member is supported accurately in its mounted position simply by tightening the pins 42 within the bushes 50 to clamp the latter firmly against the end faces of the torque plate arms 14. Removal of the caliper member 18 from the torque plate for pad replacement purposes is equally simply effected by releasing the pins 42 and lifting the caliper member out from the opening defined between the torque plate arms 14. It will be seen that the bushes 50 remain at all times retained within the caliper member, so that at no time are the sliding surfaces disturbed or separated. However, in order to protect the sealing boots 51, both during mounting of the caliper member 18 on the torque plate 10 and during its removal therefrom, the bushes 50 must be restrained from rotation and are shown in FIG. 1 as being formed with holes 52 engageable by a simple tool such as a screwdriver or a tommy bar. Alternatively, the bush may be provided with a shoulder engageable by a tool such as a spanner by which rotation of the bush may be prevented. Any other form of anti-rotation means, may, however, be provided for example by arranging a key and keyway between the lugs 36 and bush 50.

Figure 6:
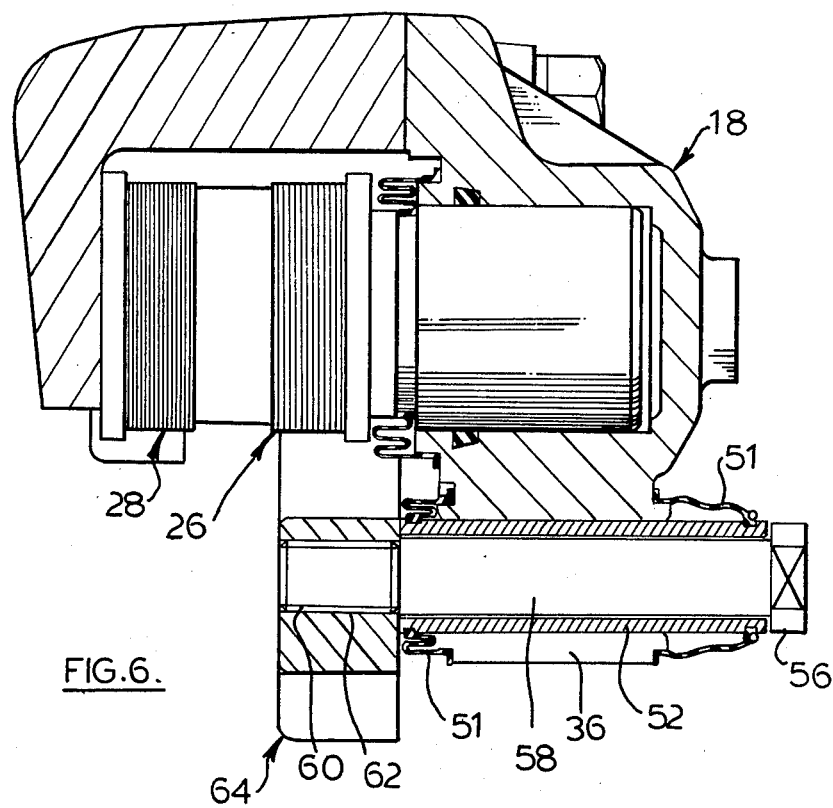
FIG. 6 is an elevation, again partly in section, similar to that of FIG. 5, showing a modified embodiment of the invention.

The brake illustrated in FIG. 6 of the drawings differs from that already described principally in that the caliper mounting pins are screwed into the torque plate. In this embodiment of the invention, the lateral lugs 36 of the caliper member 18 are fitted with bushes 52 which are internally plain and a pin 54 having a head 56 and a plain shank portion 58 is passed through each bush to extend beyond the same at its free end. The free end of the pin 54 is threaded as indicated at 60 and engages within a complementarily threaded aperture 62 of a torque plate 64. The caliper member 18 is thus readily mounted on the torque plate 64 by passing the pin through the bush and when the pin is tightened within the torque plate aperture 62, the bush is securely clamped between the torque plate and the head 56 of the pin. In all other respects, the construction and operation of this embodiment of the invention is similar to that already described.

In the above embodiments and in the embodiments described hereafter, the disc brakes may be adapted for use in commercial vehicles by forming the torque plate as a carrier for mounting on the vehicle axle.

FIGS. 7 to 11 of the drawings illustrate further modifications of the invention, wherein the sliding surfaces for the caliper member are provided directly by the pins rather than by bushes but wherein separate clamping screws are provided (rather than the pins themselves) for clamping the pins to the torque plate, thereby enabling the pins to remain permanently in the torque plate and thus to protect and preserve the operative relationship of the sliding surfaces.

Figure 7:
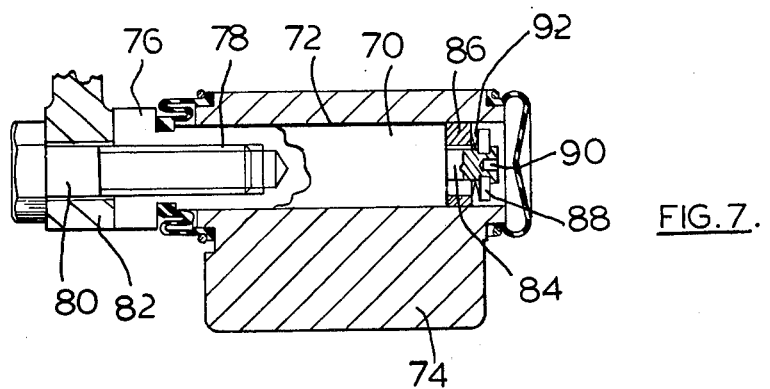

In FIG. 7, a pin 70 is received as a sliding fit in aperture 72 of a torque plate 74 and projects at one end from the aperture 72 to terminate in an enlarged diameter head 76. The projecting end of the pin 70 is axially bored and threaded as indicated at 78 in order to receive a clamping screw 80 which passes through a lug 82 of the caliper member. At its opposite end, the pin 70 has a reduced diameter portion 84 on which is mounted a friction ring 86 secured in position by a washer 88 and locknut 90, dished spring washers 92 mounted in back-to-back relation being interposed between the friction ring 86 and washer 88. In the operation of the brake, therefore, as the brake friction pads (not shown) wear, the caliper member and hence the pin 70 move to the left as viewed in the drawing, but when the brake is released, the caliper member is recentred by the spring washers 92. When the pad wear exceeds a predetermined amount, however, the locknut 90 moves the friction ring 86 in the aperture 72, with the result that the caliper member adopts a new position, thus conserving the fluid requirement of the hydraulic motor for full brake application.

Figure 8:
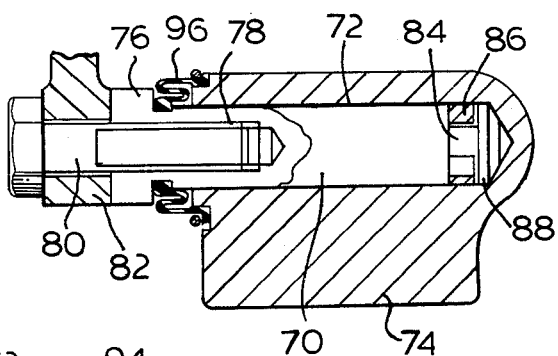

The brake illustrated in FIG. 8 differs from that of FIG. 7 only in that the spring washers 92 are omitted.

Figure 9:
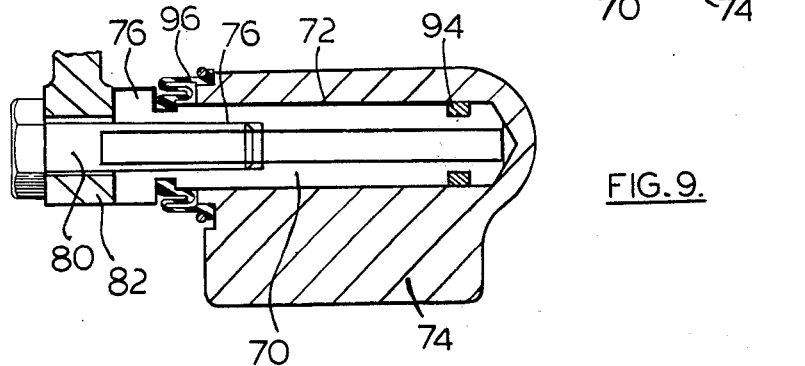
Figure 10:
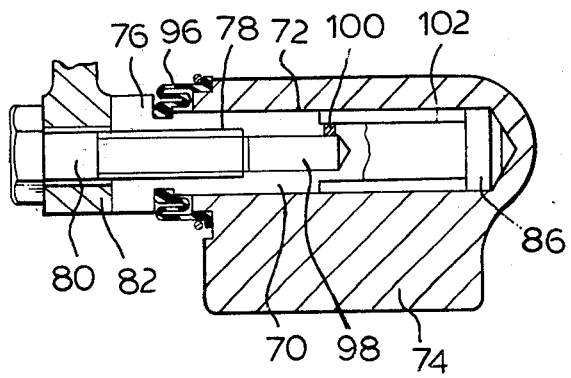

The brake shown in FIG. 9 achieves a result similar to that of FIGS. 7 and 8 by substituting a resilient e.g. elastomeric sealing ring 94 at the inner end of the pin 70 in place of the friction ring 86.

It will be noted that in the brakes of FIGS. 8 and 9, the pin 70 is received in a blind aperture 72 of the torque plate, so that only a single sealing boot 96 is required to exclude dirt and moisture from the sliding surfaces of the pin and the caliper member. A similar arrangement is provided in FIG. 10, but in this instance, the pin 70 has an axial bore 98 opening into a radial port 100 formed in a reduced diameter inner end portion 102 of the pin, enabling air to escape easily from the aperture 72 when the pin is first introduced into it.

Figure 11:
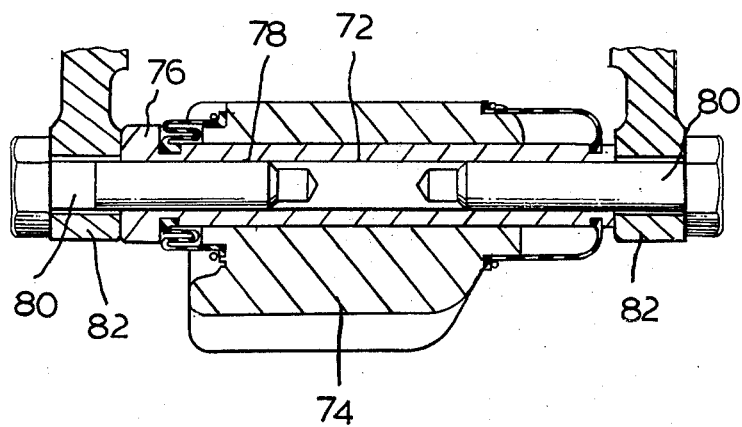

Although in all the embodiments of FIGS. 7 to 10, the caliper member is supported on one side only of the torque plate, FIG. 11 illustrates an arrangement wherein the caliper member is provided with a portion straddling the torque plate to present a lug 82 at each side thereof and wherein a pin 104 passes through the torque plate aperture 72 to extend on each side of the torque plate. Each end of the pin 104 is then axially bored and threaded to receive a clamping screw 80 passing through a respective caliper lug 82, whereby the caliper member is enabled to be supported on both sides of the torque plate.

In addition to hydraulic actuation, the sliding caliper disc brake shown in FIGS. 12 to 14 provides for mechanical actuation by way of a peg 110 which incorporates an automatic adjuster mechanism. The peg 110 abuts against the hydraulic piston 112 and is displaceable by rotation of a shaft 114 coupled to the peg 110 by a dolly 116. The shaft 114 is intended to be connected to a vehicle handbrake linkage.

As is clear from FIG. 13, the pads 118 are guided by arms 120 of the torque plate 122 so that drag forces are directly transmitted to the torqueplate during brake actuation. The pads are additionally guided on a removable pin 124 mounted in the caliper and extending through an oversize opening in a lug 126 extending from each of the pad back plates. To restrain movement of the pads in the caliper, a leaf spring 128 is arranged with its ends abutting the pad back plates at 130 and intermediate regions abutting against projecting portions of the caliper at 132. The removable pin 124 spans an opening 134 in the top of the caliper, the opening 134 permitting visual inspection of the pad friction material when the disc brake is assembled in a vehicle.

FIG. 14 shows one of the pins by which the caliper housing is mounted on the torque plate. The pin 136 extends into an oversize blind bore 138 and is provided with a pair of resilient bushes 140, of for example, plastics material, which are arranged between a shoulder 143 formed on the pin and a washer 141 secured to the end of the pin by a fastener 142. As in the arrangements shown in FIGS. 7 to 11, a separate clamping screw passing as a free fit through the bore in a caliper lug 146 secures the pin 136 to the caliper. The lug 146 is clamped between the head 144 of the clamping screw and an enlarged diameter head 148 on the pin 136.

The resilient bushes 140 serve to accommodate such misalignment of the bores in the lug and torque plate as may arise through flexing of the torque plate when the brake is under extreme load. In one modification (now shown), the resilient bushes 140 are replaced by resilient tubular members seated in flutes formed in the pin.

The embodiment of FIGS. 15 to 17 incorporates a unitary caliper, that is, a caliper formed in one piece, in which the outer limb is cut away to permit machining of the hydraulic cylinder bores without the necessity for splitting the caliper. As in previously described embodiments, both pad back plates 150 are in sliding engagement with arms 152 on the torque plate so that circumferential drag is taken up directly by the torque plate thus freeing the mounting pins of circumferential load.

Unlike the arrangement illustrated in FIG. 14 in which the pins 136 extend across both pads and must therefore be widely spaced apart to clear the disc when the brake is assembled in a vehicle, the mounting pins 136 in the embodiment of FIGS. 15 to 17 are disposed rearwardly of the directly actuated pad. The pins 154 may thus be brought closer together to lie within the periphery of the disc resulting in reduced circumferential dimension of the caliper and torque plate. With the exception of the disposition of the pins, relative to the pads, the means by which the caliper is mounted on the torque plate is similar to that of FIG. 14 so that like reference numerals have been used in FIGS. 16 and 17. One further advantage of the embodiment of FIGS. 15 to 17 is that the centre of gravity lies within the length of the pins 136 so that the caliper is better balanced than is the cantilever-mounted caliper of FIG. 14.

We claim:

1. A sliding caliper disc brake comprising a rotatable disc, a torque plate member for fixing to a vehicle frame or the like, a caliper member straddling a minor portion of the periphery of the disc for moving friction pad means disposed on opposite sides of the disc into braking engagement with the disc, portions of the torque plate member being arranged to receive directly drag forces experienced by each of the pad means, motor means in the caliper member for directly urging one pad means onto one side of the disc to cause the caliper member to slide relative to the torque plate member to apply by reaction the opposite pad means to the other side of the disc, and a sliding connection between the caliper member and the torque plate member comprising a first component slidably received in an opening in one of the members, a second component passing through an oversized opening in the other of said members and screw threadedly engaging said first component to releasably clamp the same against the other of said members, said oversized opening providing sufficient clearance for relative transverse movement between said second component and the other of said members.

2. The brake of claim 1 wherein said one of said members is the torque plate member and the other of said members is the caliper member.

3. The brake of claim 1 including resilient means between the sliding surfaces of said first component and said one of said members.

4. The brake of claim 1 having a pair of said sliding connections and including resilient means between the sliding surfaces of one of said pair.

5. The brake of claim 1 including means for holding one of said components against rotation whilst the other component is rotated during formation and release of said sliding connection.

6. The brake of claim 1 wherein said second component has a formation by which said second component may be rotated and said first component has a formation by which said first component may be held against rotation and wherein said formations are both on the same side of the disc.

7. A sliding caliper disc brake comprising a rotatable disc, a torque plate member adapted for fixing to a vehicle frame or the like, a caliper member slidable relative to said torque plate member for moving friction pads disposed on opposite sides of said brake disc into braking engagement with said disc, portions of the torque plate member being arranged to receive directly drag forces experienced by each pad means, at least one removable pin means constructed in two parts, one of said parts having a sliding surface in a complementary opening in one of said members, the other of said parts passing with a clearance fit through an oversize opening in the other of said members and being threadedly engaged with the first part of said pin means, said clearance fit allowing transverse movement of said other part in said opening, said first and second pin parts having opposed abutment surfaces engaging said other member at opposite ends of said oversized opening and being constructed and arranged that when said pin parts are lockingly screwed together the abutment surfaces clamp between them the opposite sides of said other member with sufficient force to prevent said transverse movement of said pin part in said oversized opening and thereby rigidly fixing said pin part in said oversized opening.

8. A sliding caliper disc brake according to claim 7 wherein said one of said members is said torque plate member and said other of said members is said caliper member.

9. A sliding caliper disc brake according to claim 7 wherein said one of said members is said caliper member and said other of said members is said torque plate member.

10. A sliding caliper disc brake according to claim 7 including resilient means between the sliding surfaces of said pin means and said one of said members.

11. A sliding caliper disc brake according to claim 7 having a pair of said removable pin means and including resilient means between the sliding surfaces of one of said pair.

12. A sliding caliper disc brake according to claim 7 including means for holding one of said parts against rotation whilst the other of said parts is rotated during formation and release of the sliding connection between said members.

13. A sliding caliper disc brake according to claim 7 wherein said second part has a formation by which said second part may be rotated and said first part has a formation by which said first part may be held against rotation and wherein said formations are both on the same side of the disc.

14. A sliding caliper disc brake according to claim 7 wherein said complementary opening is closed at one end and wherein sealing means seal the other end.

15. A sliding caliper disc brake comprising a rotatable disc, a torque plate member for fixing to a vehicle frame or the like, a caliper member straddling a minor portion of the periphery of the disc for moving friction pad means disposed on opposite sides of the disc into braking engagement with the disc, portions of the torque plate member being arranged to receive directly drag forces experienced by each of the pad means, motor means in the caliper member for directly urging one pad means onto one side of the disc to cause the caliper member to slide relative to the torque plate member to apply by reaction the opposite pad means to the other side of the disc, and a sliding connection between the caliper member and the torque plate member comprising a first component slidably received in an opening in one of the members, and a second component passing through an opening in the other of said members and being laterally adjustable therein into alignment with said first component, said first and second components having complementary screw-threaded portions by which said first and second components are locked together to clamp said first component to said other of said members.

16. A sliding caliper disc brake comprising a rotatable disc, a torque plate member for fixing to a vehicle frame or the like, a caliper member straddling a minor portion of the periphery of the disc for moving friction pad means disposed on opposite sides of the disc into braking engagement with the disc, portions of the torque plate member being arranged to receive directly drag forces experienced by each of the pad means, motor means in the caliper member for directly urging one pad means onto one side of the disc to cause the caliper member to slide relative to the torque plate member to apply by reaction the opposite pad means to the other side of the disc, and a sliding connection between the caliper member and the torque plate member comprising a first component slidably received in an opening in one of the members, and a second component having a screw-threaded portion and passing through an opening in the other of said members and being laterally adjustable therein into alignment with a complementary screw-threaded opening in said first component, said first and second components being locked together by screw-threaded engagement to clamp said first component to said other of said members.

* * * * *